United States Patent
Flanders et al.

(10) Patent No.: US 6,833,532 B1
(45) Date of Patent: Dec. 21, 2004

(54) METHOD AND SYSTEM FOR FEEDBACK CONTROL OF OPTICAL FIBER LENS FUSING

(75) Inventors: Dale C. Flanders, Lexington, MA (US); Jonathan R. Coppeta, Windham, NH (US); Douglas A. Simpson, Billerica, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/757,856

(22) Filed: Jan. 11, 2001

Related U.S. Application Data

(63) Continuation of application No. 09/740,430, filed on Dec. 19, 2000, now abandoned.

(51) Int. Cl.[7] .................................................. G02B 6/32
(52) U.S. Cl. ............................ 219/383; 385/33; 385/96
(58) Field of Search ............................... 219/383, 502, 219/506; 385/96, 33–35; 65/378, 387

(56) References Cited

U.S. PATENT DOCUMENTS

| | | | | |
|---|---|---|---|---|
| 4,758,386 A | * | 7/1988 | Fanning | 264/1.26 |
| 4,804,395 A | * | 2/1989 | Clark et al. | 65/387 |
| 4,867,776 A | * | 9/1989 | Sharp | 65/387 |
| 5,009,482 A | * | 4/1991 | Lincoln | 385/35 |
| 5,551,968 A | * | 9/1996 | Pan | 65/387 |
| 5,563,969 A | * | 10/1996 | Honmou | 385/35 |
| 5,845,024 A | * | 12/1998 | Tsushima et al. | 385/33 |
| 5,870,195 A | * | 2/1999 | Sasan | 356/355 |
| 6,301,406 B1 | * | 10/2001 | Irie et al. | 385/33 |

FOREIGN PATENT DOCUMENTS

| | | | |
|---|---|---|---|
| JP | 6-82663 | * | 3/1994 |
| JP | 8-5864 | * | 1/1996 |
| JP | 8-271763 | * | 10/1996 |
| JP | 11-109177 | * | 4/1999 |

* cited by examiner

*Primary Examiner*—John A. Jeffery
(74) *Attorney, Agent, or Firm*—J. Grant Houston

(57) ABSTRACT

A method and system for fusing an optical fiber lens is compatible with automation. Specifically, the fusing of the fiber lens is controlled in response to a diffraction pattern of light exiting from the fiber lens. This diffraction pattern is indicative of the lens shape and characteristics. Specifically, light is injected into an optical fiber and a diffraction pattern of the light exiting from a fiber lens is detected. The fiber lens is then fused in response to this diffraction pattern.

13 Claims, 9 Drawing Sheets

METHOD AND SYSTEM FOR FEEDBACK CONTROL OF OPTICAL FIBER LENS FUSING

RELATED APPLICATION

This application is a Continuation of U.S. application Ser. No. 09/740,430, filed on Dec. 19, 2000, entitled "Method and System for Feedback Control of Optical Fiber Lens Fusing," by Flanders et al, now abandoned. The entire teachings of which are incorporated herein by this reference.

BACKGROUND OF THE INVENTION

In fiber optic systems, optimization of coupling efficiency between the optical fiber via the fiber's endface and active and/or passive devices is an important metric for comparison at the system level. A popular technique for improving coupling efficiency includes providing a lens at the fiber endface. This lens can be formed by drawing or etching the fiber. Generally, however, fiber-polishing techniques yield the best and most consistent fiber lens profiles.

Fiber polishing, however, often yields sharp surface features or microscopically rough surfaces. To smooth these features and round-over sharp corners, it is common to expose the polished fiber lens to a fusing step.

SUMMARY OF THE INVENTION

The typical approach to fusing is to carefully monitor the positioning of the fiber endface between the fuser electrodes in combination with optimizing the fuser current and fusing duration. A similar approach can be used with flame fusing. After repeating many experiments, an experienced technician can generate fiber lenses with good profiles at acceptable yields. It is further common to include visual inspection techniques between fuser exposures to monitor the progress of the fusing operation.

The present invention concerns a method and system for fusing an optical fiber lens.

The system is compatible with automation. Specifically, the fusing of the fiber lens is controlled in response to a diffraction pattern of light exiting from the fiber lens. This diffraction pattern is indicative of the lens shape and characteristics. Further, it is generally easier to assess the lens shape from the diffraction pattern rather than visual inspection.

In general, according to one aspect, the invention features a method for fusing an optical fiber lens. This method comprises injecting light into an optical fiber and detecting a diffraction pattern of the light exiting from a fiber lens at a proximal end of the optical fiber. The fiber lens is then fused in response to this diffraction pattern.

In the preferred embodiment, the step of injecting light into the optical fiber comprises energizing a laser that is coupled to a distal end of the optical fiber. In an alternative embodiment, a technique similar to that used in fiber coupling may be used where the fiber is bent and light injected into the core through the cladding.

According to other aspects of the preferred embodiment, the step of detecting the diffraction pattern comprises detecting a far-field diffraction pattern. This is preferably performed using a two-dimensional detector, such as a CCD camera detector that is located optically in front of the fiber lens—the detector need not be located physically in front of the fiber lens if there is intervening fold optics, for example.

In one present embodiment, the diffraction pattern is analyzed by determining a ratio of a lateral size to a transverse size of the diffraction pattern. The fiber lens is exposed to a fusing arc until the ratio of the transverse to lateral size reaches a desired ratio.

In general, according to another aspect, the invention can also be characterized as a system for fusing an optical fiber lens. This system comprises a light source that injects light into an optical fiber and a detector that detects a diffraction pattern of a light exiting from a fiber lens at a proximal end of the optical fiber. An arc fuser is disposed to fuse this fiber lens. A controller activates the fuser in response to the diffraction pattern detected by the detector.

The above and other features of the invention including various novel details of construction and combinations of parts, and other advantages, will now be more particularly described with reference to the accompanying drawings and pointed out in the claims. It will is be understood that the particular system and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
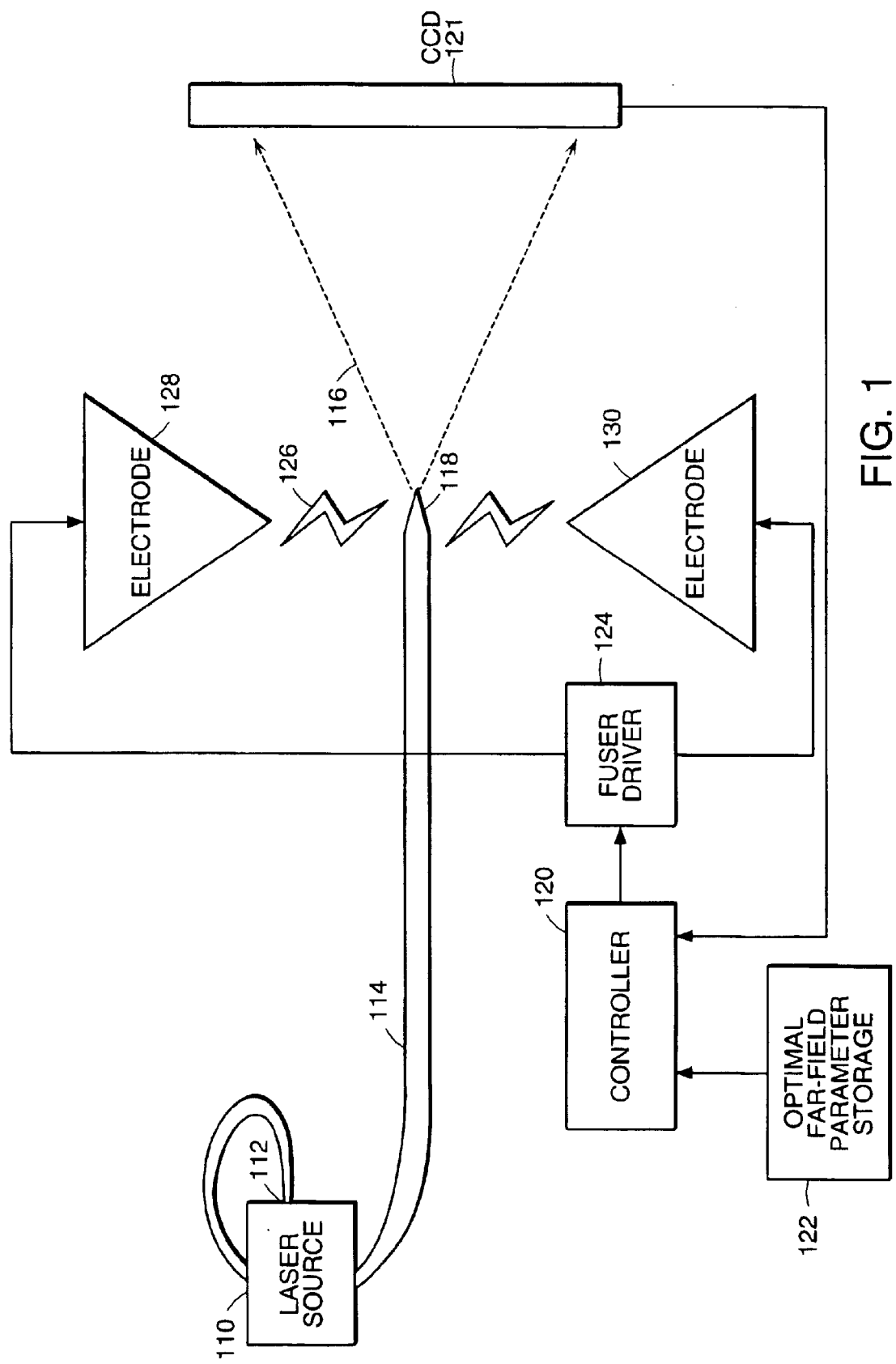
FIG. 1 is a schematic, block diagram of an optical fiber lens electrofusing system according to the present invention.

FIG. 1 shows an optical fiber lens electrofusing system, which has been constructed according to the principles of the present invention.

Specifically, a laser source 110 injects light into a distal end 112 of an optical fiber 114. In the current embodiment, the fiber is single mode fiber. In alternative embodiments, polarization-maintain fiber is used. In alternative embodiments, a light source can be used that injects light through a cladding of the optical fiber 14 after bending the fiber, for example.

The light 116 is emitted from an endface of the fiber 114. In the current implementation, an intermediary fiber lens 118 has been formed on the endface of the optical fiber 114 by a polishing process.

The light 116 exiting from the lens 1 18 forms a diffraction pattern. This diffraction pattern is detected by a camera or detector 121. In the preferred embodiment, this is a CCD detector that has a two dimensional array of detecting elements as are found in conventional camera-type detectors.

In the preferred embodiment, the detector 121 is positioned relative to the lens 118 to detect a far-field diffraction pattern. The far-field region is typically defined as the region where the angular field distribution is essentially independent of distance from the source. If the source has a maximum overall dimension D that is large compared to the wavelength, the far-field region is commonly taken to exist at distances greater than $2D^2/\lambda$ from the source, $\lambda$ being the wavelength, which is typically between 1300 to 1600 nanometers. In the case of single mode fiber, D is between 6 and 10 micrometers, typically.

The camera 121 is connected to a controller 122. This controller detects or analyzes the diffraction pattern detected by the camera. In one implementation, the controller compares a width or lateral size of the diffraction pattern formed by light 116 on the camera 121 to a height or transverse size of the light diffraction pattern formed on a camera 121. Based on this information, the controller compares the detected diffraction pattern and specifically the derived parameters to optimal far field parameters stored in an optimal far field parameter storage 122.

Based on the comparison of the detected far field and the optimal far field pattern, the controller 120 operates a fuser system comprising a fuser driver 124, which is typically a high voltage source, that drives a current 126 between electrodes 128, 130. The fiber lens 118 is physically placed between the electrodes 128, 130, so that it is exposed to the resulting plasma, and thereby heated, resulting in the fusing the endface 118.

According to the invention, an electrofuser system is used. These have advantages relative to flame and laser fusing systems. Specifically, electrofuser typically have lower placement tolerances of the fiber between the electrodes in order to obtain reproducible results.

Figure 2:
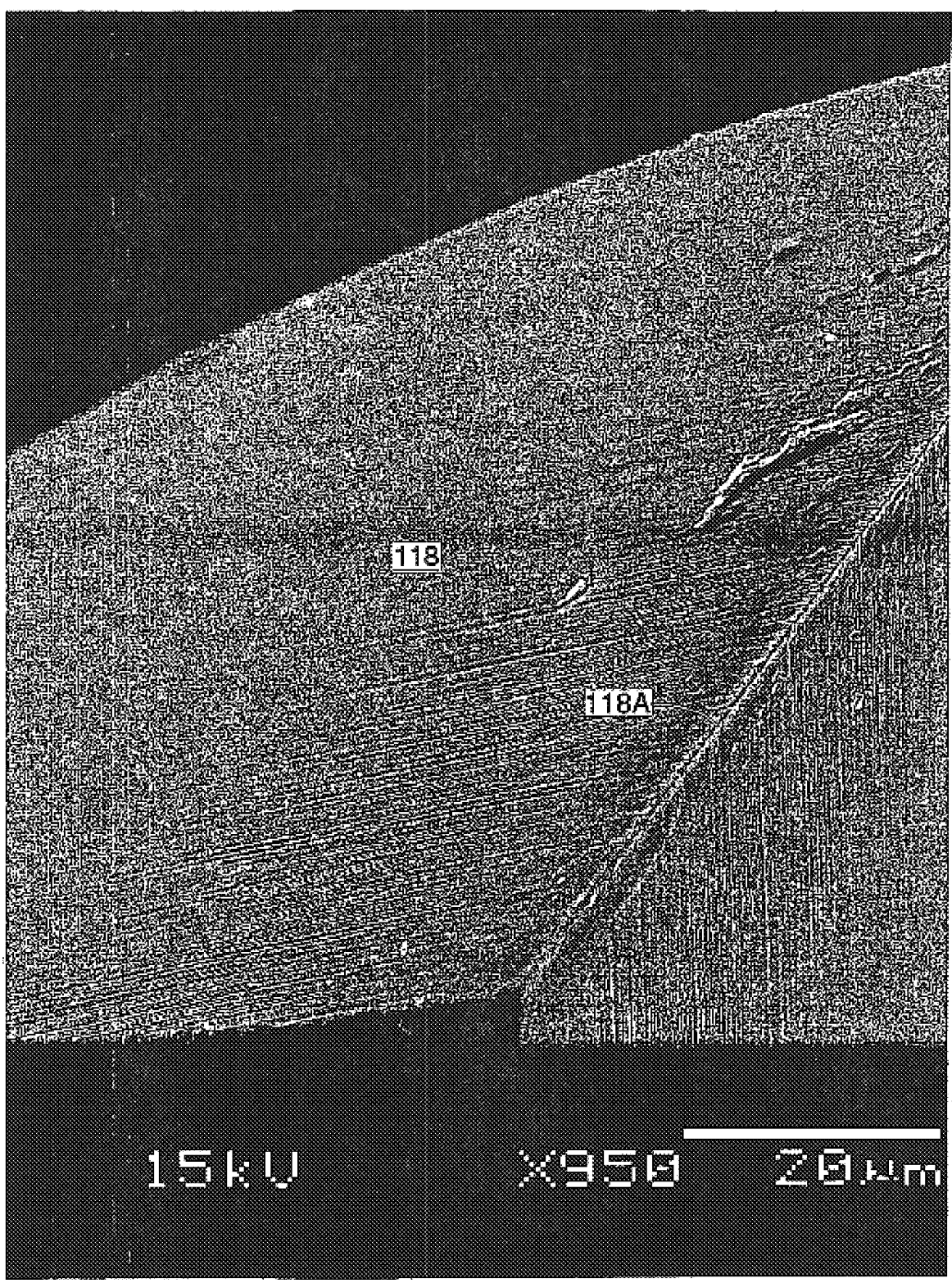
FIG. 2 is an image of a polished fiber lens prior to fusing.

FIG. 2 is an image of an intermediate, wedge-shaped, fiber lens 118 immediately after the polishing operation and prior to fusing. As can be seen, there are striations on the surface of the lens that are artifacts of the polishing process. Moreover, it has relatively sharp corners at, for example, the tip 118A.

Figure 3:
FIG. 3 is a far field diffraction pattern of light exiting from a fiber lens prior to beginning the fusing operation.

When this fiber lens is installed into the fusing system, it produces a far field diffraction pattern as shown in FIG. 3. The controller 120 recognizes this far field diffraction pattern as being suboptimal and as a result, begins the fusing operation.

Figure 4A:
FIGS. 4A through E show a far field diffraction pattern after 500, 2500, 6500, 9000, and 11000 milliseconds of fusing, respectively, according to the present invention.

FIG. 4A shows the far field diffraction pattern after 500 milliseconds (msec) of fusing. One embodiment, the 500 msec of fusing is performed in a single long pulse. In another embodiment, the 500 msec of fusing is a concatenation of 100 msec pulses.

The controller 120 calculates a lateral to transverse size of the pattern. In one implementation, this ratio is calculated based upon a 3 dB width (full width, half maximum) of the maximum pixel intensity contour. This ratio is 6.11 for FIG. 1. In one embodiment, the optimal ratio stored in storage 122 is 2.75.

Figure 4B:
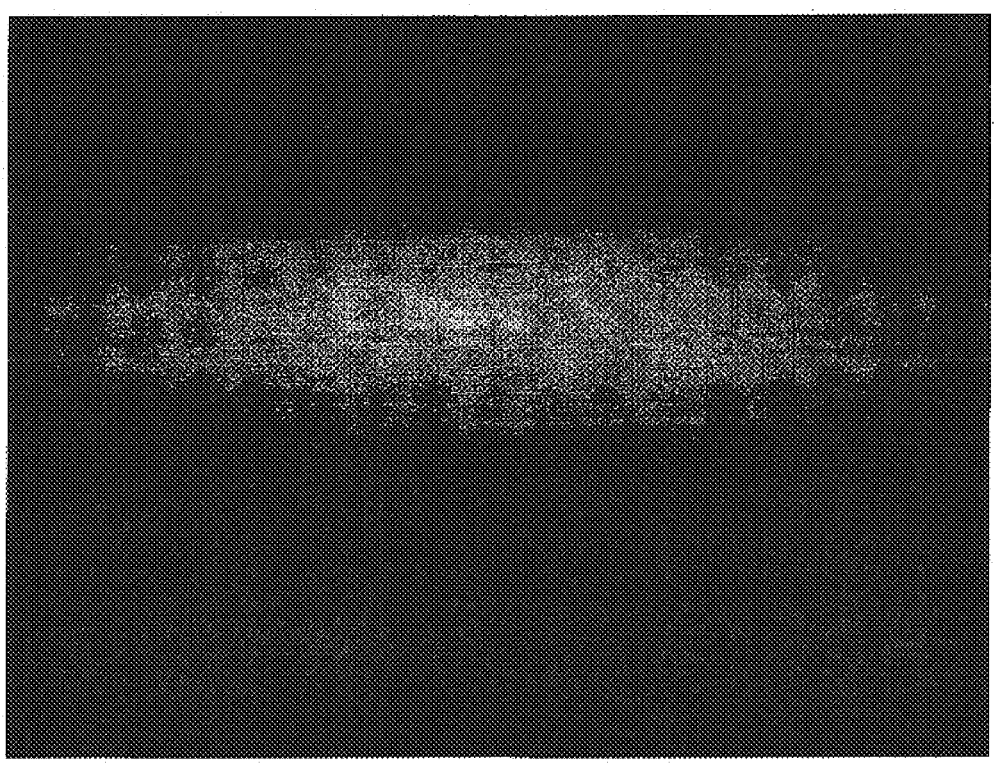
Figure 4C:
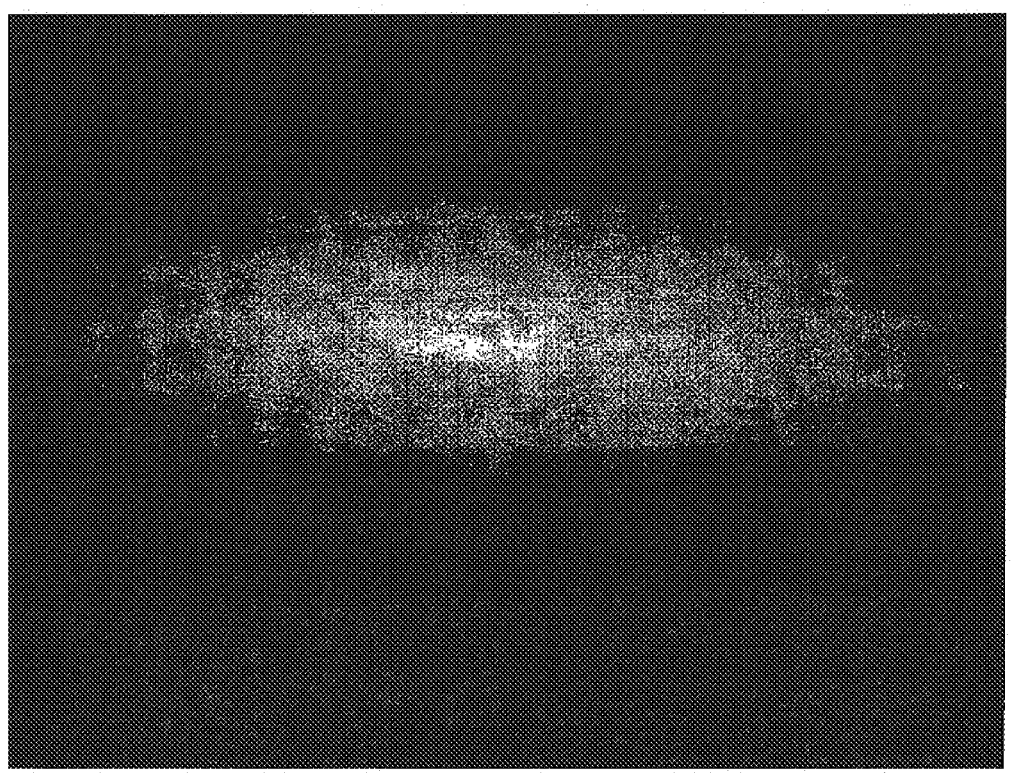
Figure 4D:
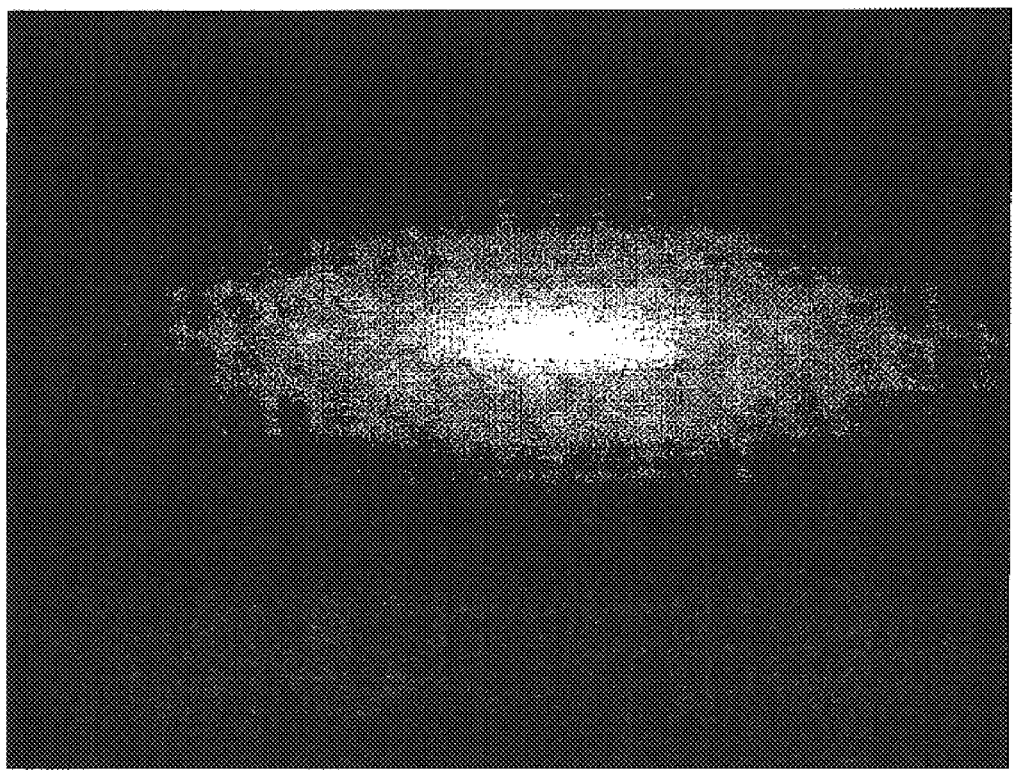
Figure 4E:
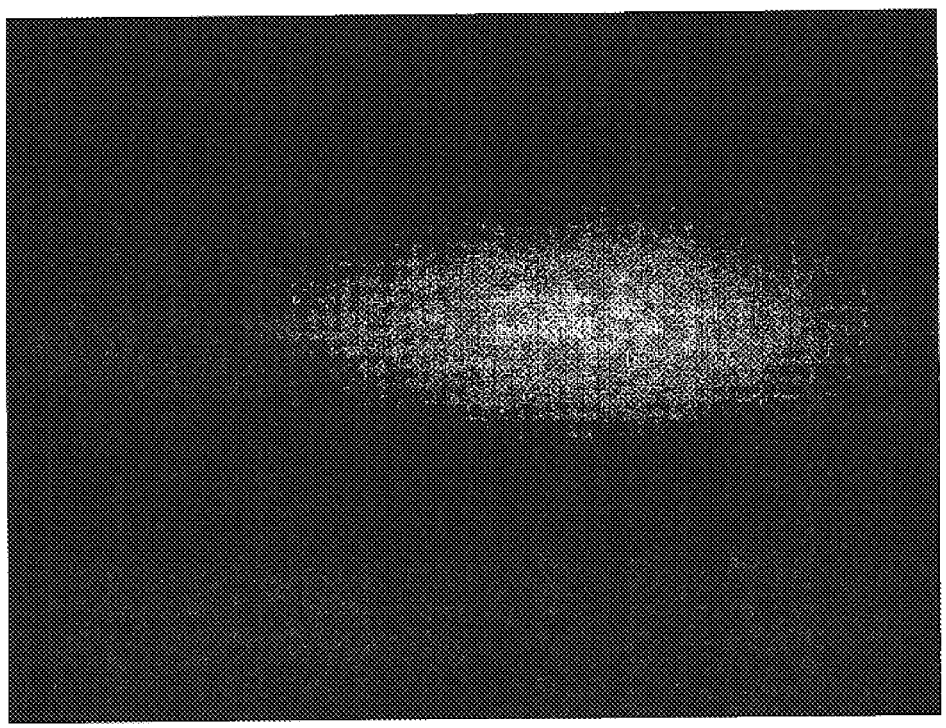
Figure 5:
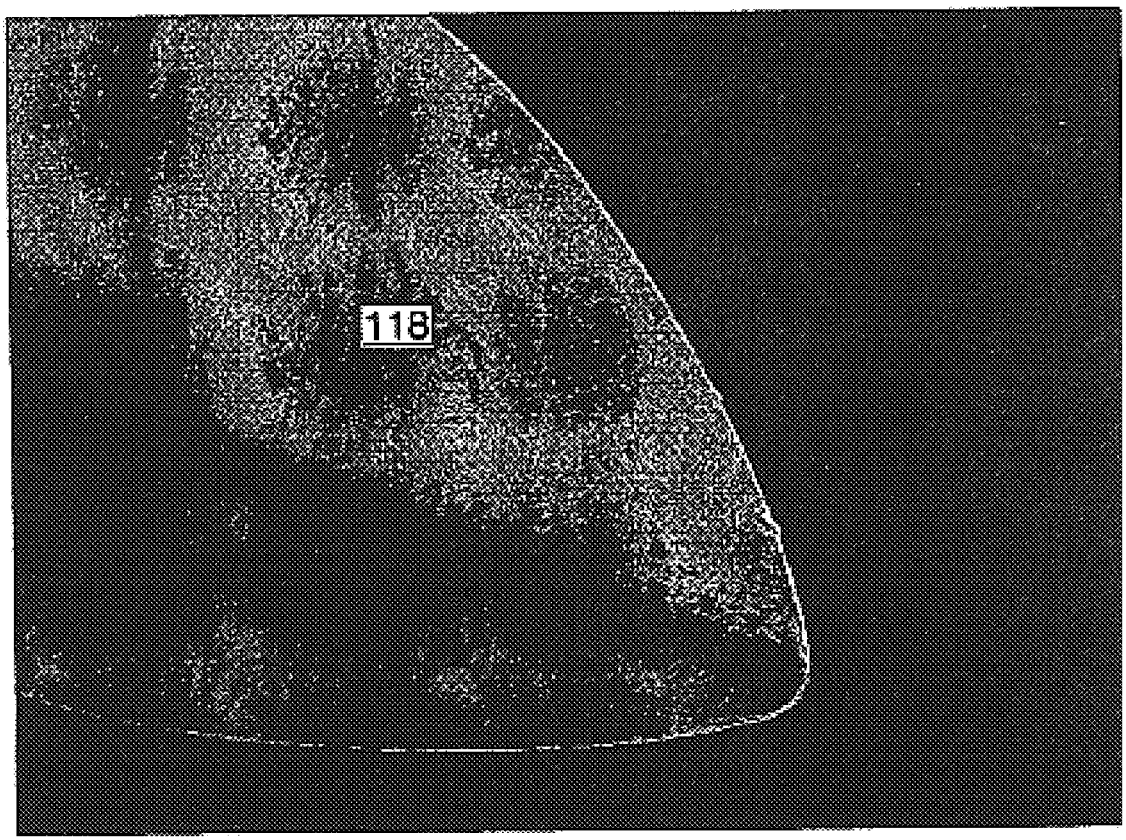
FIG. 5 is an image of a fiber lens after the fusing operation has been completed.

Thus, the endface is fused for another 2000 msec and the far field pattern is detected as shown in FIG. 4B. The resulting ratio is 4.55. The endface is fused for another 4000 msec and the pattern of FIG. 4C is detected. There the ratio is 3.45, which is still not within an acceptable window around the optimal 2.75 ratio. Two more successive fusings of 2500 msec and 2000 msec are performed, see FIG. 4D and 4E, having ratios 3.12 and 2.74, before the optimal ratio is achieved FIG. 5 shows the resulting endface after the fusing operation has been performed. The is fiber lens 118 now has a much smoother profile. Moreover, the surface striations associated with the polling operation have been removed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for fusing an optical fiber lens, comprising:
    injecting light into an optical fiber having a wedge-shaped fiber lens formed by polishing at a proximal end of the optical fiber;
    detecting a diffraction pattern of the light exiting from the fiber lens; and
    electro-fusing the fiber lens in response to a two-dimensional distribution of the diffraction pattern; and
    analyzing a two-dimensional distribution of the diffraction pattern by determining a ratio of a lateral size to a transverse size of the diffraction pattern.

2. A method as claimed in claim 1, wherein the step of injecting the light into the optical fiber comprises energizing a laser that is coupled to a distal end of the optical fiber.

3. A method as claimed in claim 1, wherein the step of detecting the diffraction pattern comprises detecting a far-field diffraction pattern.

4. A method as claimed in claim 1, wherein the step of detecting the diffraction pattern comprises positioning a two-dimensional detector optically in front of the fiber lens.

5. A method as claimed in claim 1, wherein the step of fusing the fiber lens comprises exposing the fiber lens to an electrical arc.

6. A system for fusing an optical fiber lens, comprising:
    a light source that injects light into an optical fiber;
    a detector that detects a two-dimensional distribution of a diffraction pattern of the light exiting from a fiber lens at a proximal end of the optical fiber, the fiber lens being wedge-shaped and having been formed by polishing;
    an arc fuser that fuses the fiber lens; and
    a controller that activates the arc fuser in response to the two-dimensional distribution of the diffraction pattern detected by the detector and determines a ratio of a lateral size to a transverse size of the diffraction pattern.

7. A system as claimed in claim 6, wherein the light source comprises a laser that is coupled to a distal end of the optical fiber.

8. A system as claimed in claim 6, wherein the detector is positioned relative to the fiber lens to detect a far-field diffraction pattern.

9. A system as claimed in claim 6, wherein the detector is positioned greater than 0.5 centimeters from the fiber lens.

10. A system as claimed in claim 6, wherein detector comprises a camera.

11. A system as claimed in claim 6, wherein the controller activates the arc fuser in a pulsed fashion until a desired diffraction pattern is detected by the detector.

12. A method for fusing an optical fiber lens, comprising:
    injecting light into an optical fiber having a wedge-shaped fiber lens formed by polishing at a proximal end of the optical fiber;
    detecting an aspect ratio of a diffraction pattern of the light exiting from the fiber lens by positioning a two-dimensional detector optically in front of the fiber lens; and
    electro-fusing the fiber lens in response to the aspect ratio of the diffraction pattern by exposing the fiber lens to an electrical arc until an optical aspect ratio is detected.

13. A method as claimed in claim 12, wherein the step of electro-fusing the fiber lens by exposing the fiber lens to the electrical arc comprises exposing the fiber lens to electrical arc pulses.

* * * * *